United States Patent Office 3,444,172
Patented May 13, 1969

3,444,172
DISPERSE DYESTUFFS OF THE ARYL-IMINAZOLE SERIES
Hisashi Senshu, Kitakyushu-shi, Fukuoka-ken, Japan, assignor to Mitsubishi Chemical Industries Limited, Tokyo, Japan, a corporation of Japan
No Drawing. Filed Sept. 10, 1964, Ser. No. 395,601
Int. Cl. C07d 57/00; D06p 1/16
U.S. Cl. 260—282         3 Claims

ABSTRACT OF THE DISCLOSURE

Dyestuffs of the following formula:

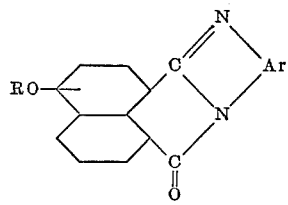

where R denotes alkyl-, aryl-, or cycloalkyl-group which may contain a substituent or substituents exclusive of the sulpho-group and carboxyl- group and Ar is either a benzene nucleus which contains a substituent or substituents exclusive of the sulpho-group and carboxyl-group, each of the two carbon atoms at the 0-position of said nucleus being combined with the two nitrogen atoms, or a naphthalene nucleus which may contain a substituent or substituents exclusive of the sulpho-groups and carboxylic-group, each of the two carbon atoms at the 0-position or the peri-position of said nucleus being combined with the two nitrogen atoms. Such dyestuffs are particularly suited for dying polyethylene terephthalate.

---

The invention relates to new disperse dyestuffs.

More particularly, the invention relates to new disperse dyestuffs, which give dyeings on hydrophobic synthetic high molecular weight materials, especially on such fibrous materials that are made from polyester such as polyethylene terephthalate.

The primary object of the invention is to provide new disperse dyestuffs, which give dyeings on the abovementioned fibrous materials in light shades, especially in yellow shades of excellent fastness to light, washing and sublimation.

Another object of the invention is to provide a method of the manufacture of our new disperse dyestuffs which is performed economically.

Further objects of the invention will be apparent from the illustration which follows.

The novel dyestuffs according to the invention are indicated by the following formula:

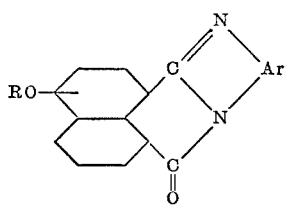

wherein R denotes alkyl-, aryl-, or cycloalkyl-group which may contain a substituent or substituents exclusive of sulpho-group and carboxyl-group and Ar is either a benzene nucleus which contains a substituent or substituents exclusive of sulpho-group and carboxyl-group, each of the two carbon atoms at the 0-position of said nucleus being combined with the two nitrogen atoms, or a naphthalene nucleus which may contain a substituent or substituents exclusive of sulpho-group and carboxylic-group, each of the two carbon atoms at the 0-position or the peri-position of said nucleus being combined with the two nitrogen atoms.

Some preferred embodiments of our novel dyestuffs are indicated by the Formulae 2, 3 and 4 which follow:

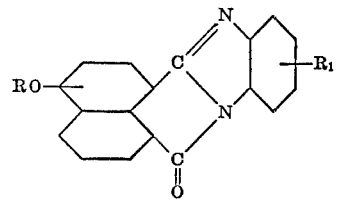

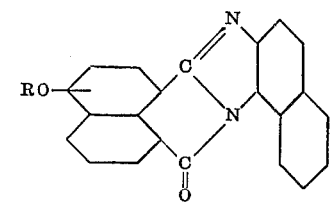

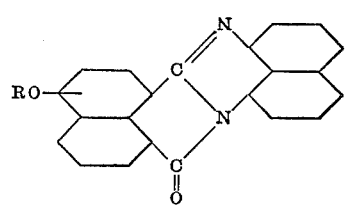

R in the Formulae 2, 3 and 4 includes alkyl-group such as methyl-, ethyl-, n-propyl-, i-propyl-, n-butyl-, i-butyl-, n-octyl- and 2-ethyl-hexyl-group; substituted alkyl-group such as hydroxyl-ethyl-, hydroxy- propyl- hydroxy-butyl-, methoxy-ethyl-, ethoxy-ethyl-, N,N-dimethylamino-ethyl-, N,N-dimethylamino-propyl-, N,N-diethylamino-ethyl-, N,N-diethylamino-propyl- and benzyl-group; aryl-group such as phenyl group; substituted aryl-group such as tolyl-, chloro-phenyl- and dichloro-phenyl-group; and cycloalkyl-group such as cyclohexyl-group. $R_1$ in the Formula 2 includes alkoxy-group such as methoxy-, and ethoxy-group; alkyl group such as methyl- and ethyl-group; and nitro-group or halogen atom.

The dyestuffs according to the invention are considered to be composed of a mixture of generally four or two kinds of such isomers that will be described later.

The method for the economical manufacture of our novel dyestuffs as indicated by the Formula 1 comprises heating a compound as indicated by the Formula 5:

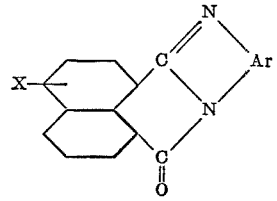

wherein X denotes a halogen atom, or sulpho-group or an alkali metal salt thereof and Ar is of the same significance as Ar in the Formula 1 with a compound as indicated by the Formula 6, which follows:

R—OH          (6)

wherein R is of the same significance as in the Formula 1 in the presence of an acid-binding agent.

The starting compound as indicated by the Formula 5 which is used in the method according to the invention may be easily obtained by heating 4-halogeno- or 4-sulphonaphthalic acid or anhydride thereof with an aryl diamine having two amino-groups at the 0-positions or the peri-positions of aryl nucleus at a temperature above 80° C. in water or an organic solvent. This process may be illustrated by reference to the following Formulae a, b and c:

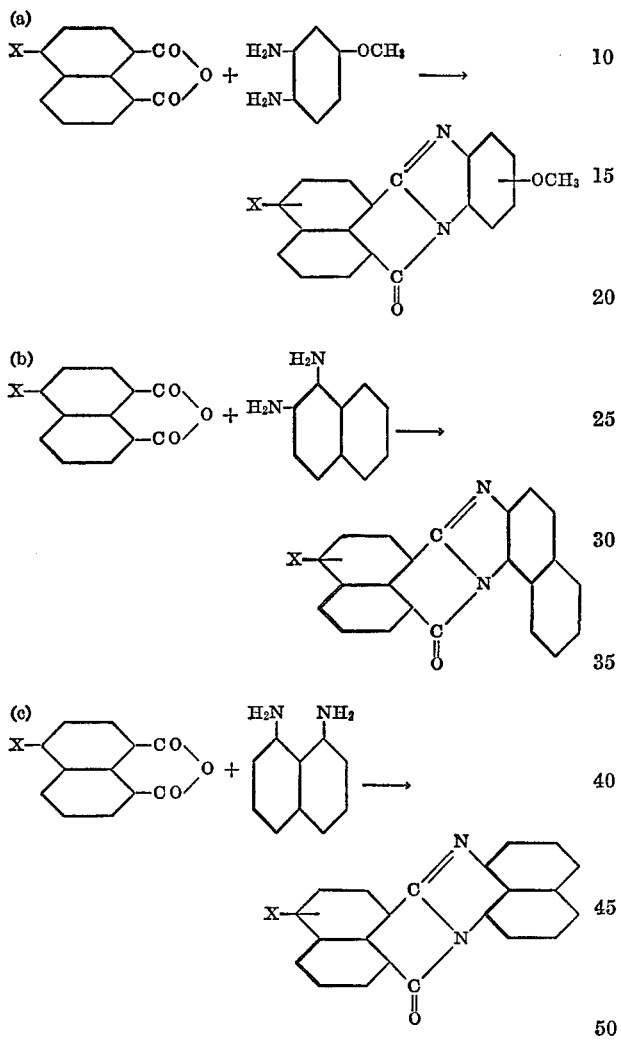

The starting compound indicated by the Formula 5 is composed substantially of four or two kinds of isomers. For example, in case an asymmetric diamine such as 3,4-diamino-anisol is chosen for the abovementioned aryl diamine, the compound of the Formula 5 consists in a mixture of four kinds of isomers as indicated in the following:

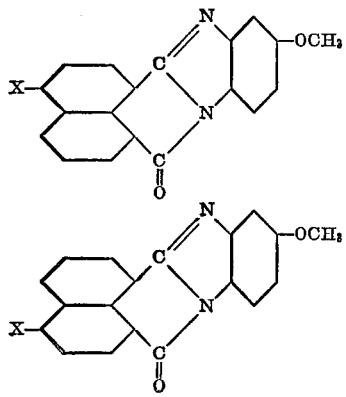

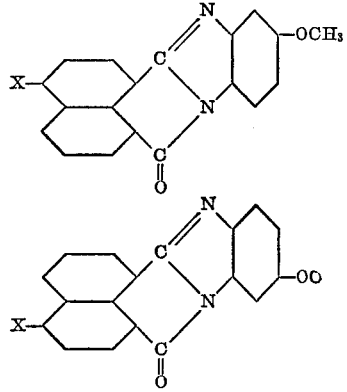

Further, in case a symmetric diamine such as 1,8-diaminonaphthalene is chosen for the aryl diamine, the compound of the Formula 5 consists in two kinds of isomers as indicated in the following:

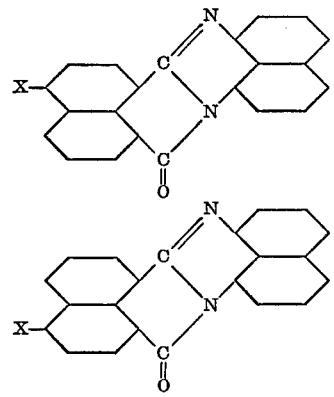

As compared with the sulpho-naphthoylene-arylimidazol derivatives such that X in the Formula 5 is —SO₃H or —SO₃Na the halogeno-naphthoylene-arylimidazol derivatives such that X in the Formula 5 is chlorine atom or bromine atom are preferably employed as the starting compound for that the production of the aimed dyestuffs with a higher yield is brought about by the latter.

Another starting compound as indicated by the Formula 6 which are employed in the method according to the invention includes alcohols such as methanol, ethanol, n-propanol, i-propanol, n-butanol, i-butanol, n-octanol, 2-ethyl-hexanol, ethylene glycol, propanediol, butanediol, methoxy-ethanol, ethoxy-ethanol, N,N-dimethylamino-ethanol, N,N-dimethylamino-propanol, N,N-diethylamino-ethanol, N,N-diethylamino-propanol, and benzylalcohol; and phenols such as phenol, cresol, chloro-phenol, and dichloro-phenol.

The reaction of the compound of the Formula 5 with the compound of the Formula 6 is caused by heating their respective starting compounds in the presence of an acid-binding agent. An alkaline compound such as sodium hydroxide, potassium hydroxide, sodium carbonate, and potassium carbonate in an approximately theoretical amount is employed as the acid-binding agent. In order to carry out the reaction with advantages, it is generally necessary to employ the compound of the Formula 6 in an exorbitant amount over the theoretical so that said component also serves as the reaction medium. In some cases, the respective starting compounds nearly in equi-mol may be employed to effect the reaction in a suitable inert solvent. The reaction in the method according to the invention is favourably carried out at an elevated temperature, preferably from 60° to 150° C. to produce the dyestuffs as indicated by the Formula 1 in which the halogen atom or sulpho-group in the compound of the Formula 5 is substituted by —OR group.

Upon completion of the reaction, the reaction mixture is cooled and added, if necessary, to water or methanol. The precipitate is recovered by filtration, washed and dried. The reaction product thus obtained is of high purity to immediately be applied to polyester fibrous materials. The purity may be heightened by recrystallization, if so desired.

The dyestuffs of our invention may be produced by another method, which will be illustrated in the following. This method consists in, as indicated by the following formula, condensing naphthalic acid or anhydride thereof which has —OR group at the 4-position with the aforementioned any aryl diamine.

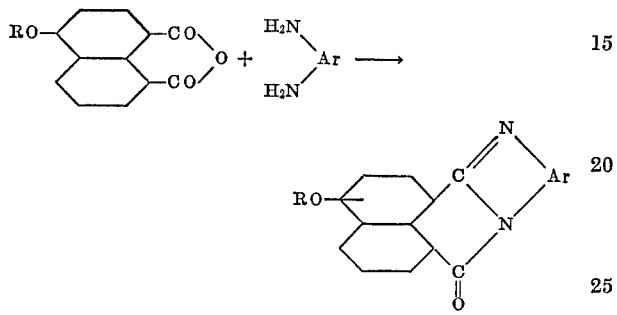

Being based on the fact as has been described that the starting compounds indicated by the Formula 5 are a mixture of four or two kinds of isomers, the dyestuffs of the invention are composed of a mixture of respectively corresponding isomers.

The dyestuffs according to the invention give dyeings on synthetic fibrous materials made from polyester such as polyethylene terephthalate in yellow or red shades of good fastness to light, washing and especially to sublimation.

The colouring of polyester synthetic fibrous materials by use of the present dyestuffs may be performed by the conventional methods in which an aqueous dispersing medium is employed and a treating bath is made up by way of uniformly dispersing the dyestuff in water using a suitable dispersing agent and or wetting agent, said bath being used for dipping or padding polyester fibrous materials at a temperature up to 100° C. The said conventional methods include the so-called carrier dyeing method in which such "carrier" as chlorobenzenes is employed and the so-called high temperature dyeing or thermosol process to be employed for dyeing polyester fibrous materials.

Some preferred embodiments of the invention will be described in detail wherein the examples given are for the purpose of illustrating preferred embodiments only and not for the purpose of limiting the same. The "part" in the following denotes the portion by weight unless otherwise specified. The melting point of the compounds shown in the following examples is of uncorrection value.

EXAMPLE I 10 parts of the compound indicated by the following formula:

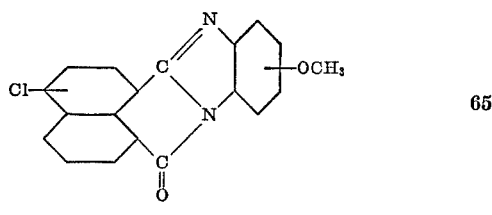

which has been obtained by condensing 4-chloro-naphthalic anhydride with an approximately equi-mol of 3,4-diamino-anisol were added to a solution comprising 10 parts of sodium hydroxide dissolved in 80 parts of methanol, heated while stirring to boil (about 73° C.) under the reflux and further stirred for 10 hrs. at this temperature. Upon completion of reaction, the reaction mixture was cooled to recover the precipitate by filtration, which was washed by 40 parts of methanol and dried to obtain 8.9 parts of the product of the following formula of melting point 175° to 185° C.

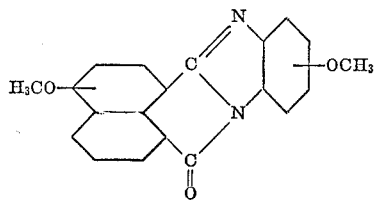

The flame-reaction test of this product showed nonexistence of chlorine. This product gives dyeings on polyester fibrous materials in an aqueous dispersing medium in brilliant yellow shades of excellent fastness to light, sublimation and washing.

As far as the fastness to sublimation is concerned, this product is superior to the product indicated by the following formula, the latter being obtained by the same method as in this example excepting the employment of O-phenylendiamine in place of 3,4-diamino-anisol:

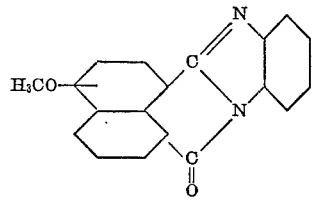

EXAMPLE 2

10 parts of the compound as indicated by the following formula:

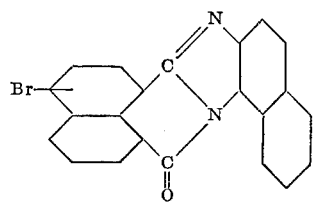

which was obtained by condensing 4-bromo-naphthalic anhydride with an approximately equi-mol of 1,2-diaminonaphthalene were added to 160 parts of methanol containing 20 parts of potassium hydroxide dissolved therein, heated while stirring and boiled under the reflux. The reaction products were stirred for 15 hrs. at the same temperature and cooled. The precipitate was recovered by filtration, washed by 80 parts of methanol and dried to obtain 6.8 parts of the product as indicated by the following formula of melting point 241° to 249° C.:

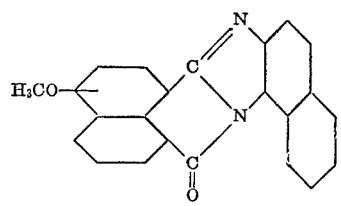

The flame-reaction test of this product showed nonexistence of bromine. This product gives dyeings on polyester fibrous materials in an aqueous dispersing medium in yellow shades of good fastness to light, washing and sublimation.

EXAMPLE 3

The compound as indicated by the following formula:

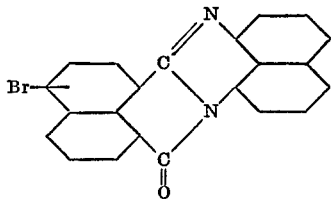

which had been obtained by condensing 4-bromo-naphthalic anhydride and 1,8-diamino-naphthalene in place of the starting compound employed in Example 2 was employed to cause reaction with methanol by the same method as in Example 2. Thus, the compound of melting point above 310° C. as indicated by the following formula was obtained.

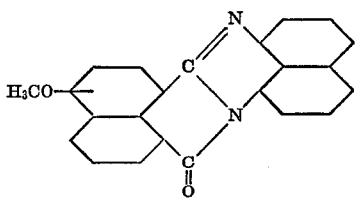

This product gives dyeings on polyester fibrous materials in an aqueous dispersing medium in bluish red shades of good fastness to light, washing and sublimation.

EXAMPLE 4

10 parts of compound as indicated by the formula:

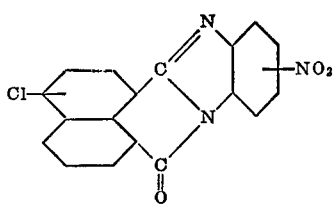

which had been obtained by condensing 4-chloro-naphthalic anhydride with an approximately equi-mol of 3,4-diaminonitrobenzene were added to 160 parts of methanol containing 40 parts of potassium carbonate dissolved therein, heated while stirring to boil and further stirred for 20 hrs. at the boiling temperature. Upon completion of reaction, the reaction mixture was allowed to cool. The precipitate recovered by filtration was washed and dried to obtain 10.0 parts of compound indicated by the following formula of melting point 285° to 292° C.:

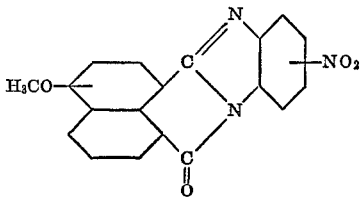

This product gives dyeings on polyester fibrous material in an aqueous dispersing medium in greenish yellow shades of good fastness. The same results may be attained by employing sodium carbonate in place of potassium carbonate.

EXAMPLE 5

A quantity of the compound as indicated by the following formula:

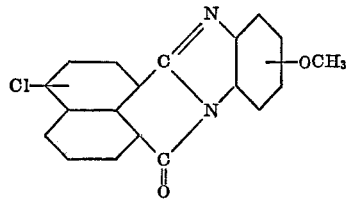

which had been obtained by condensing 4-chloro-naphthalic anhydride with an approximately equi-mol of 3,4-diaminoanisol was added to a solution comprising 200 parts of ethylene glycol in which 20 parts of sodium hydroxide were dissolved, and heated while stirring to cause reaction for 6 hrs. at 120° C. Upon completion of reaction, the insoluble matter in a small amount was removed by filtration, 500 parts of water were added to the filtrate and then added to a small amount of hydrochloric acid to be acidified. The precipitate was recovered by filtration, washed and dried to obtain 9.0 parts of the product as indicated by the following formula of melting point 272° to 276° C.;

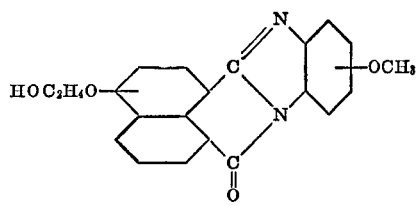

This product gives dyeings on polyester fibrous materials in an aqueous dispersing medium in yellow shades of good fastness to light, washing and sublimation.

EXAMPLES 6 TO 10

The products as shown in the following table, column B were obtained by the same method as described in Example 5 excepting the employment of the compounds appearing in the column A in place of the ethylene glycol:

| No. | A | B Product |
|---|---|---|
| Ex. 6 | n-Butanol | 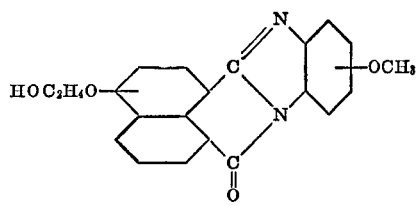 |

| No. | A | B Product |
|---|---|---|
| Ex. 7 | Methoxy-ethanol | H₃COC₂H₄O—[structure]—OCH₃ |
| Ex. 8 | N.N-dimethylaminoethanol | (CH₃)₂NC₂H₄O—[structure]—OCH₃ |
| Ex. 9 | Benzylalcohol | [benzyl]—CH₂O—[structure]—OCH₃ |
| Ex. 10 | Cyclohexanol | H—[cyclohexyl]—O—[structure]—OCH₃ |

| No. | Melting point (° C.) | Shade on polyester fibers |
|---|---|---|
| Ex. 6 | 249–252 | Yellow. |
| Ex. 7 | 130–136 | Do. |
| Ex. 8 | 186–188 | Brilliant yellow. |
| Ex. 9 | 206–222 | Orange yellow. |
| Ex. 10 | 288–293 | Brilliant yellow. |

EXAMPLE 11

10 parts of the starting compound as employed in Example 5 were added to a solution comprising 200 parts of phenol in which 20 parts of potassium hydroxide were dissolved and heated to 140° C. while stirring to cause reaction at this temperature for 6 hrs. Upon completion of reaction, the reaction mixture was added to 1000 parts of aqueous 10% NaOH solution. The precipitate recovered by filtration was washed and dried. The crude cake thus obtained was refined by glacial acetic acid to obtain 9.8 parts of the product as indicated by the following formula of melting point 98° to 108° C.:

[structure: phenyl—O—[fused ring system]—OCH₃]

This product gives dyeings on polyester fibrous materials in brilliant yellow shades of excellent fastness to light, washing and sublimation.

EXAMPLES 12 to 14

The products appearing in the following table, column B were obtained by the same method as described in Example 11 excepting the employment the compounds appearing in the column A in place of phenol:

| No. | A | B Product |
|---|---|---|
| Ex. 12 | p-Cresol | H₃C—[phenyl]—O—[structure]—OCH₃ |

| No. | A | B Product |
|---|---|---|
| Ex. 13 | p-Chloro-phenol | 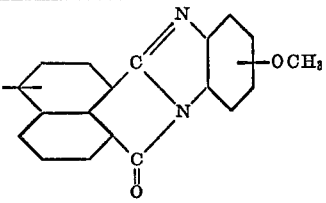 |
| Ex. 14 | m-Dichloro-phenol | 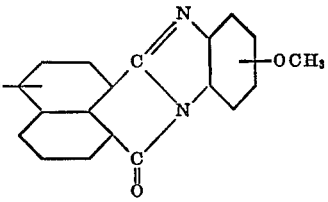 |

| No. | Melting point (° C.) | B Shade on polyester fibers |
|---|---|---|
| Ex. 12 | 174–182 | Brilliant yellow. |
| Ex. 13 | 171–176 | Do. |
| Ex. 14 | 185–195 | Do. |

EXAMPLE 15

10 parts of the compound as indicated by the following formula:

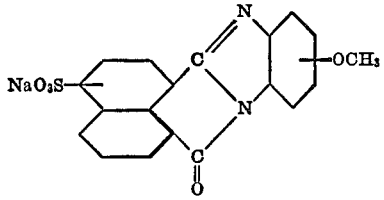

which had been obtained by condensing 4-sulpho-naphthalic acid with 3,4-diamino-anisol were added to a solution comprising 160 parts of methanol in which 20 parts of sodium hydroxide were dissolved and heated while stirring until boiling (approximately 82° C.) to cause reaction for 20 hrs. Upon completion of reaction, the reaction mixture was cooled and added to 400 parts of water. The precipitate recovered by filtration was washed and dried to obtain 6.3 parts of dyestuff as indicated by the same formula referred to in Example 1.

This product gives dyeings on polyester fibrous materials in slightly greenish yellow shades of good fastness.

What I claim is:

1. Disperse dyestuff of the formula

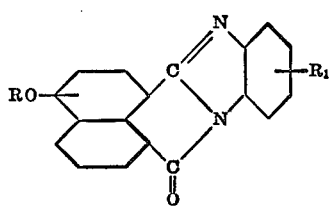

wherein R is selected from a class consisting of alkyl groups of 1 to 4 carbon atoms, cyclohexyl, benzyl, hydroxyethyl, methoxyethyl and N,N-dimethylaminoethyl; and $R_1$ is selected from alkoxy groups of 1 to 4 carbon atoms and nitro.

2. The method for the manufacture of disperse dyestuffs of the formula

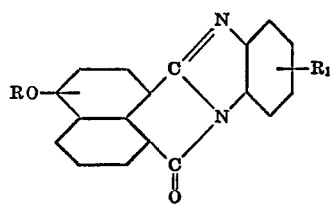

wherein R is selected from a class consisting of alkyl groups of 1 to 4 carbon atoms, cyclohexyl, benzyl, hydroxyethyl, methoxyethyl and N,N-dimethylaminoethyl; $R_1$ is selected from alkoxy groups of 1 to 4 carbon atoms and nitro; the method comprising the step of heating a compound having the formula

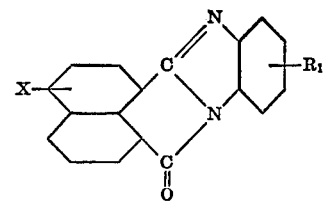

wherein X is selected from a class consisting of halogen, sulpho groups, and alkali metal salts thereof and $R_1$ is the same as above with a compound of the formula

R—OH wherein R is of the same significance as the R above, at a temperature of from 60° C. to 150° C. in the presence of an alkali metal hydroxide or an alkali metal carbonate.

3. Method for the manufacture of disperse dyestuffs of the formula

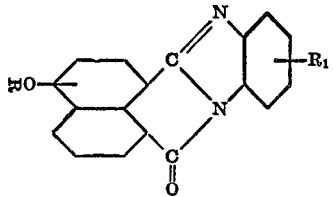

which comprises the step of heating a compound of the formula

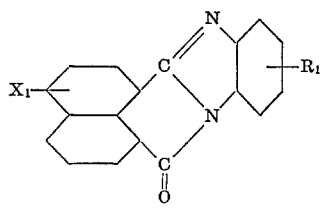

wherein $X_1$ is selected from a class consisting of chlorine, bromine, —$SO_3H$, —$SO_3Na$, and —$SO_3K$ with a compound of the formula

R—OH wherein R is of the same significance as the R in the formula of claim 2, at a temperature from 60° C. to 150° C. in the presence of an alkali metal hydroxide or an alkali metal carbonate.

References Cited

UNITED STATES PATENTS

| 3,103,403 | 9/1963 | Eaton et al. | 260—309.6 |
| 3,299,065 | 1/1967 | Dien | 260—251 |
| 2,949,467 | 8/1960 | Staeuble | 260—249.5 |
| 3,322,769 | 5/1967 | Fuchs et al. | 260—282 |

FOREIGN PATENTS 1,111,620  3/1956  France.

OTHER REFERENCES

Arient et al.: Collection Czechoslov. Chem. Commun., vol. 24, pp.1111–1112 (1959).

ALEX MAZEL, *Primary Examiner.*

R. V. RUSH, *Assistant Examiner.*

U.S. Cl. X.R.

8—55